(12) United States Patent
Zang et al.

(10) Patent No.: US 11,055,708 B2
(45) Date of Patent: *Jul. 6, 2021

(54) RESOURCE DEDUCTION METHOD AND APPARATUS, INTELLIGENT TERMINAL, AND DEDUCTION SERVER

(71) Applicant: Tencent Technology (Shenzhen) Company Limited, Shenzhen (CN)

(72) Inventors: Jing Zang, Shenzhen (CN); Zhenyu Xu, Shenzhen (CN); Wa Ye, Shenzhen (CN); Peiku Li, Shenzhen (CN); Jingwei Chen, Shenzhen (CN); Sicheng Huang, Shenzhen (CN); Cunjin Li, Shenzhen (CN); Zheng Wang, Shenzhen (CN); Mengsha Zhou, Shenzhen (CN); Jiongchao Lin, Shenzhen (CN); Cunliang Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/014,973

(22) Filed: Sep. 8, 2020

(65) Prior Publication Data

US 2020/0402045 A1  Dec. 24, 2020

Related U.S. Application Data

(63) Continuation of application No. 15/709,830, filed on Sep. 20, 2017, now Pat. No. 10,803,455, which is a
(Continued)

(30) Foreign Application Priority Data

Sep. 30, 2015 (CN) .......................... 201510643730.8

(51) Int. Cl.
*G06Q 20/38* (2012.01)
*G06Q 20/32* (2012.01)
(Continued)

(52) U.S. Cl.
CPC ....... *G06Q 20/387* (2013.01); *G06Q 20/3224* (2013.01); *G06Q 20/405* (2013.01); *G06Q 30/0211* (2013.01); *G06Q 30/0236* (2013.01)

(58) Field of Classification Search
CPC ............. G06Q 20/387; G06Q 20/3224; G06Q 20/405; G06Q 30/0211; G06Q 30/0236
(Continued)

(56) References Cited

FOREIGN PATENT DOCUMENTS

| CN | 101702221 A | 5/2010 |
|---|---|---|
| CN | 102414710 A | 4/2012 |

(Continued)

OTHER PUBLICATIONS

Bimal Viswanath, Towards Detecting Anomalous User Behavior in Online Social Networks, 2014 (Year: 2014).*
(Continued)

*Primary Examiner* — Tarek Elchanti
(74) *Attorney, Agent, or Firm* — Morgan, Lewis & Bockius LLP

(57) ABSTRACT

The present disclosure belongs to the field of network technologies, and discloses a resource deduction method and apparatus, an intelligent terminal, and a deduction server. The method includes: sending a rule obtaining request for a deduction rule of a user-specified deduction item to the deduction server; receiving the deduction rule returned by the deduction server; calculating a second resource value that is obtained after applying the deduction rule to a first resource value associated with the user-specified deduction item; and sending a resource transfer request carrying the second resource value to the deduction server. The present
(Continued)

disclosure resolves a problem that a merchant needs to manually calculate expense that is obtained after applying the deduction rule to the first resource, and payment efficiency is relatively low. Expense that is obtained after applying the deduction rule to the first resource is automatically calculated by using an intelligent terminal, and payment efficiency is improved.

20 Claims, 11 Drawing Sheets

Related U.S. Application Data continuation-in-part of application No. PCT/CN2016/098146, filed on Sep. 5, 2016.

(51) Int. Cl.
    *G06Q 20/40*     (2012.01)
    *G06Q 30/02*     (2012.01)

(58) Field of Classification Search
    USPC ........................................................ 705/14.1
    See application file for complete search history.

(56) References Cited

FOREIGN PATENT DOCUMENTS

| | | | |
|---|---|---|---|
| CN | 102419851 A | 4/2012 | |
| CN | 103179194 A | 6/2013 | |
| CN | 104572299 A | 4/2015 | |
| CN | 105303400 A | 2/2016 | |
| WO | WO-2004077330 A1 * | 9/2004 | ............ G06Q 30/02 |
| WO | WO 2004077330 A1 | 9/2004 | |
| WO | WO 2013015746 A2 | 1/2013 | |

OTHER PUBLICATIONS

Kenneth Hess and Amy Newman, Desktop Virtualization in Action, May 2, 2011.
Tencent Technology, ISRWO, PCT/CN2016/098146, dated Nov. 30, 2016, 9 pgs.
Tencent Technology, IPRP, PCT/CN2016/098146, dated Apr. 3, 2018, 8 pgs.

* cited by examiner

Subtract, if a deduction rule includes a third resource value and a deduction value that are restricted by a cash off deduction formula, when a first resource value is greater than the third resource value in the cash off deduction formula, the deduction value from the first resource value, to obtain a second resource value — 506a Multiply, if a deduction rule includes a discount restriction condition and a first discount coefficient, when a user level of a user account number at a target object provider meets the discount restriction condition, a first resource value by the first discount coefficient, to obtain a second resource value, where the discount coefficient is less than 1 — 506b Multiply, if a deduction rule includes a point deduction condition and a second discount coefficient, when both a first resource value and a user point of the user account number at a target object provider meet the point deduction condition, the user point by the second discount coefficient, record an obtained product as a deduction value, and subtract the deduction value from the first resource value, to obtain a second resource value — 506c

RESOURCE DEDUCTION METHOD AND APPARATUS, INTELLIGENT TERMINAL, AND DEDUCTION SERVER

CROSS REFERENCE TO RELATED APPLICATIONS

This application is a continuation application of U.S. patent application Ser. No. 15/709,830, entitled "RESOURCE DEDUCTION METHOD AND APPARATUS, INTELLIGENT TERMINAL, AND DEDUCTION SERVER" filed on Sep. 20, 2017, which is a continuation-in-part application of PCT/CN2016/098146, entitled "RESOURCE DEDUCTION METHOD AND APPARATUS, INTELLIGENT TERMINAL, AND DEDUCTION SERVER" filed on Sep. 5, 2016, which claims priority to Chinese Patent Application No. 201510643730.8, filed with the State Intellectual Property Office of the People's Republic of China on Sep. 30, 2015, and entitled "RESOURCE DEDUCTION METHOD AND APPARATUS", all of which are incorporated herein by reference in their entirety.

FIELD OF THE TECHNOLOGY

Embodiments of the present disclosure relate to the field of network technologies, and in particular, to a resource deduction method and apparatus, an intelligent terminal, and a deduction server.

BACKGROUND OF THE DISCLOSURE

To boost consumption of purchasers, a merchant usually provides a coupon or a membership card that can be used to deduct some money when a purchaser purchases a product from the merchant.

A user may download in advance the coupon provided by the merchant or registers for the membership card of the merchant in advance, and takes the downloaded coupon or the membership card that is registered for to a store of the merchant for consumption. When payment is made for a selected product, the coupon or the membership card is shown to the merchant. A clerk in the store calculates, according to the coupon or the membership shown by the user, money that can be used to be deducted from the payment, to obtain expense that the user still needs to finally pay after the deduction, and shows the expense to the user. The user pays the merchant expense that is obtained after applying the deduction rule to the first resource.

In such a manner of using a coupon or a membership card, a merchant needs to perform calculation of deduction and offset by using the coupon or the membership card, and then, a user can pay expense obtained after deduction. In this case, payment efficiency is relatively low.

SUMMARY

To resolve a problem that a merchant needs to manually calculate expense that is obtained after applying the deduction rule to the first resource, and payment efficiency is relatively low, embodiments of the present disclosure provide a resource deduction method and apparatus, an intelligent terminal, and a deduction server. Technical solutions are as follows.

According to a first aspect, a resource deduction method is performed at a computer server having one or more processors and memory storing one or more programs to be executed by the one or more processors, the method comprising:

receiving, from a social networking application running at a mobile terminal, a deduction item obtaining request initiated by a user of the mobile terminal, the deduction item obtaining request including a user account identifier associated the user of the mobile terminal at the social networking application and a current location of the mobile terminal;

in response to the deduction item obtaining request, determining multiple deduction items in accordance with the user account identifier, the current location of the mobile terminal and the user's past consumption activities at service providers corresponding to the multiple deduction items and recorded under their respective service provider accounts at the social networking application;

returning the multiple deduction items to the mobile terminal, wherein the multiple deduction items are arranged at the mobile terminal using the social networking application in a predefined order according to at least their corresponding service providers' actual distances from the current location of the mobile terminal;

receiving, from the social networking application running at the mobile terminal, a rule obtaining request for a deduction rule associated with a user-specified deduction item; and in response to the rule obtaining request, returning the deduction rule associated with the user-specified deduction item, wherein the mobile terminal applies, via the social networking application, a transaction corresponding to the deduction rule to a first resource value associated with the user-specified deduction item, the first resource value being used to indicate the quantity of resources that need to be transferred from the user account identifier of the user of the mobile terminal to the corresponding service provider account when a target object associated with the user-specified deduction item is assigned to the user account identifier;

receiving, from the social networking application running at the mobile terminal, a resource transfer request corresponding to the transaction; and in response to the resource transfer request, returning a clearing notification to the mobile terminal, the clearing notification including an update to the user-specified deduction item at the corresponding service provider account according to the deduction rule to be displayed at the mobile terminal using the social networking application.

According to a second aspect, a computer server comprises one or more processors, memory and one or more programs stored in the memory that, when being executed by the one or more processors, cause the computer server to perform a plurality of operations including:

receiving, from a social networking application running at a mobile terminal, a deduction item obtaining request initiated by a user of the mobile terminal, the deduction item obtaining request including a user account identifier associated the user of the mobile terminal at the social networking application and a current location of the mobile terminal;

in response to the deduction item obtaining request, determining multiple deduction items in accordance with the user account identifier, the current location of the mobile terminal and the user's past consumption activities at service providers corresponding to the multiple deduction items and recorded under their respective service provider accounts at the social networking application;

returning the multiple deduction items to the mobile terminal, wherein the multiple deduction items are arranged at the mobile terminal using the social networking application in a predefined order according to at least their corresponding service providers' actual distances from the current location of the mobile terminal;

receiving, from the social networking application running at the mobile terminal, a rule obtaining request for a deduction rule associated with a user-specified deduction item; and in response to the rule obtaining request, returning the deduction rule associated with the user-specified deduction item, wherein the mobile terminal applies, via the social networking application, a transaction corresponding to the deduction rule to a first resource value associated with the user-specified deduction item, the first resource value being used to indicate the quantity of resources that need to be transferred from the user account identifier of the user of the mobile terminal to the corresponding service provider account when a target object associated with the user-specified deduction item is assigned to the user account identifier;

receiving, from the social networking application running at the mobile terminal, a resource transfer request corresponding to the transaction; and in response to the resource transfer request, returning a clearing notification to the mobile terminal, the clearing notification including an update to the user-specified deduction item at the corresponding service provider account according to the deduction rule to be displayed at the mobile terminal using the social networking application.

According to a third aspect, a non-transitory computer readable storage medium stores one or more computer readable instructions that, when being executed by one or more processors of a computer server, cause the computer server to perform a plurality of operations including:

receiving, from a social networking application running at a mobile terminal, a deduction item obtaining request initiated by a user of the mobile terminal, the deduction item obtaining request including a user account identifier associated the user of the mobile terminal at the social networking application and a current location of the mobile terminal;

in response to the deduction item obtaining request, determining multiple deduction items in accordance with the user account identifier, the current location of the mobile terminal and the user's past consumption activities at service providers corresponding to the multiple deduction items and recorded under their respective service provider accounts at the social networking application;

returning the multiple deduction items to the mobile terminal, wherein the multiple deduction items are arranged at the mobile terminal using the social networking application in a predefined order according to at least their corresponding service providers' actual distances from the current location of the mobile terminal;

receiving, from the social networking application running at the mobile terminal, a rule obtaining request for a deduction rule associated with a user-specified deduction item; and in response to the rule obtaining request, returning the deduction rule associated with the user-specified deduction item, wherein the mobile terminal applies, via the social networking application, a transaction corresponding to the deduction rule to a first resource value associated with the user-specified deduction item, the first resource value being used to indicate the quantity of resources that need to be transferred from the user account identifier of the user of the mobile terminal to the corresponding service provider account when a target object associated with the user-specified deduction item is assigned to the user account identifier;

receiving, from the social networking application running at the mobile terminal, a resource transfer request corresponding to the transaction; and in response to the resource transfer request, returning a clearing notification to the mobile terminal, the clearing notification including an update to the user-specified deduction item at the corresponding service provider account according to the deduction rule to be displayed at the mobile terminal using the social networking application The beneficial effects brought by the technical solutions provided in the embodiments of the present disclosure.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following descriptions show merely some embodiments of the present disclosure, and a person of ordinary skill in the art may still derive other drawings from these accompanying drawings without creative efforts.

FIG. 5C is a flowchart of calculation methods corresponding to different types of deduction rules according to an embodiment of the present disclosure;

DESCRIPTION OF EMBODIMENTS

To make the objectives, technical solutions, and advantages of the present disclosure clearer, the following further describes the implementation manners of the present disclosure in detail with reference to the accompanying drawings.

Figure 1:
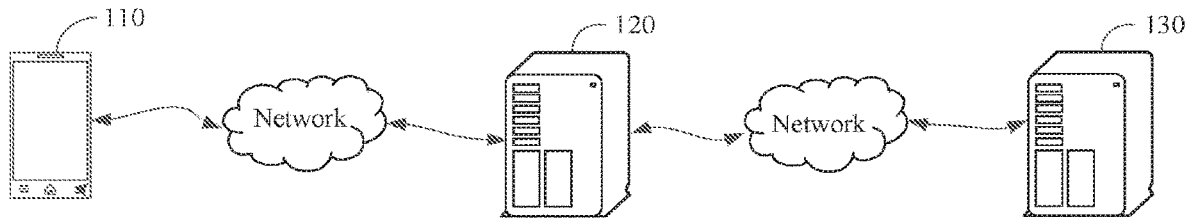
FIG. 1 is a schematic diagram of an implementation environment involved in a resource deduction method according to some embodiments of the present disclosure.

FIG. 1 is a schematic diagram of an implementation environment involved in a resource deduction method according to some embodiments of the present disclosure. As shown in FIG. 1, the implementation environment may include: an intelligent terminal 110, a deduction server 120, and a resource transfer server 130. In some embodiments, the intelligent terminal 110 has a social networking application running that communicates with the deduction server 120 via text messages. As will described below, the user account identifier of the social networking application may also be used for exchanging information with the deduction server 120 and may be the resource transfer server 130.

The intelligent terminal 110 may be connected to the deduction server 120 in a wireless network manner.

In some embodiments, a client may be installed in the intelligent terminal 110. The client is a client that has an object replacement function and that registers with the intelligent terminal 110. The client may communicate with the deduction server 120.

The intelligent terminal 110 described herein may include a smartphone, a tablet computer, an in-vehicle system, and the like.

The deduction server 120 may be connected to the resource transfer server 130 in a wired network manner or in a wireless network manner.

The deduction server 120 may be one server or a cluster of a plurality of servers. The resource transfer server 130 may be one server or a cluster of a plurality of servers. The deduction server 120 and the resource transfer server 130 may be further one server or two parts in a service cluster.

Figure 2:
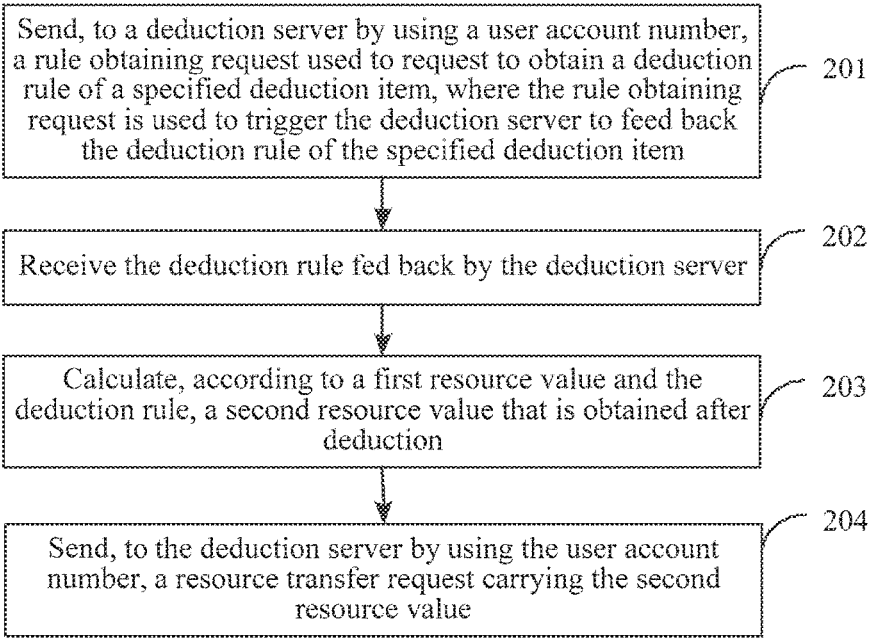
FIG. 2 is a flowchart of a resource deduction method according to an embodiment of the present disclosure.

FIG. 2 is a flowchart of a resource deduction method according to an embodiment of the present disclosure. The resource deduction method may be applied to the intelligent terminal 110 and the like in the implementation environment shown in FIG. 1. As shown in FIG. 2, the resource deduction method includes the following operations:

Operation 201: Send a rule obtaining request for a deduction rule of a user-specified deduction item to the deduction server, where the rule obtaining request is used to trigger the deduction server to return the deduction rule of the user-specified deduction item.

Operation 202: Receive the deduction rule returned by the deduction server.

Operation 203: Calculate a second resource value that is obtained after applying the deduction rule to a first resource value associated with the user-specified deduction item.

Operation 204: Send a resource transfer request carrying the second resource value to the deduction server.

To sum up, in the resource deduction method provided in this embodiment of the present disclosure, a deduction rule is obtained from a deduction server; a second resource value that is obtained after applying the deduction rule to the first resource is calculated according to a first resource value and the deduction rule; and a resource transfer request carrying the second resource value is sent to the deduction server by using a user account identifier. The deduction server instructs a resource transfer server to transfer a resource of the second resource value out of a resource account of the user account identifier. An intelligent terminal may automatically calculate, according to a deduction rule of a user-specified deduction item, expense that is obtained after applying the deduction rule to the first resource, and the resource transfer server automatically deducts a resource that needs to be transferred after deduction. Therefore, a problem that a merchant needs to manually calculate expense that is obtained after applying the deduction rule to the first resource, and payment efficiency is relatively low is resolved; expense that is obtained after applying the deduction rule to the first resource is automatically calculated by using an intelligent terminal, and payment efficiency is improved.

Figure 3:
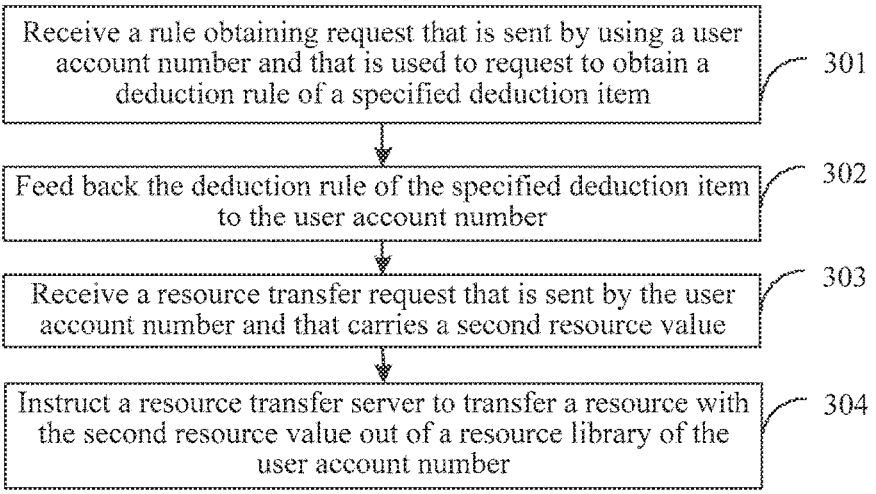
FIG. 3 is a flowchart of a resource deduction method according to an embodiment of the present disclosure.

FIG. 3 is a flowchart of a resource deduction method according to an embodiment of the present disclosure. The resource deduction method is applied to the deduction server 120. As shown in FIG. 3, the resource deduction method includes the following operations:

Operation 301: Receive a rule obtaining request that is sent by using a user account identifier and that is used to request to obtain a deduction rule of a user-specified deduction item.

Operation 302: Return the deduction rule of the user-specified deduction item to the user account identifier.

Operation 303: Receive a resource transfer request that is sent by the user account identifier and that carries a second resource value.

Operation 304: Instruct a resource transfer server to transfer a resource of the second resource value out of a resource account of the user account identifier.

To sum up, in the resource deduction method provided in this embodiment of the present disclosure, a deduction rule is sent to a requesting intelligent terminal, so that the intelligent terminal calculates a second resource value according to the deduction rule, and instructs a resource transfer server to transfer a resource with the second resource value out of a resource account of a user account identifier bound to the intelligent terminal. A deduction server may send a deduction rule of a user-specified deduction item to the intelligent terminal, the intelligent terminal automatically calculates expense that is obtained after applying the deduction rule to the first resource, and the resource transfer server automatically deducts a resource that needs to be transferred after deduction. Therefore, a problem that a merchant needs to manually calculate expense that is obtained after applying the deduction rule to the first resource, and payment efficiency is relatively low is resolved; expense that is obtained after applying the deduction rule to the first resource is automatically calculated by using an intelligent terminal, and payment efficiency is improved.

Figure 4:
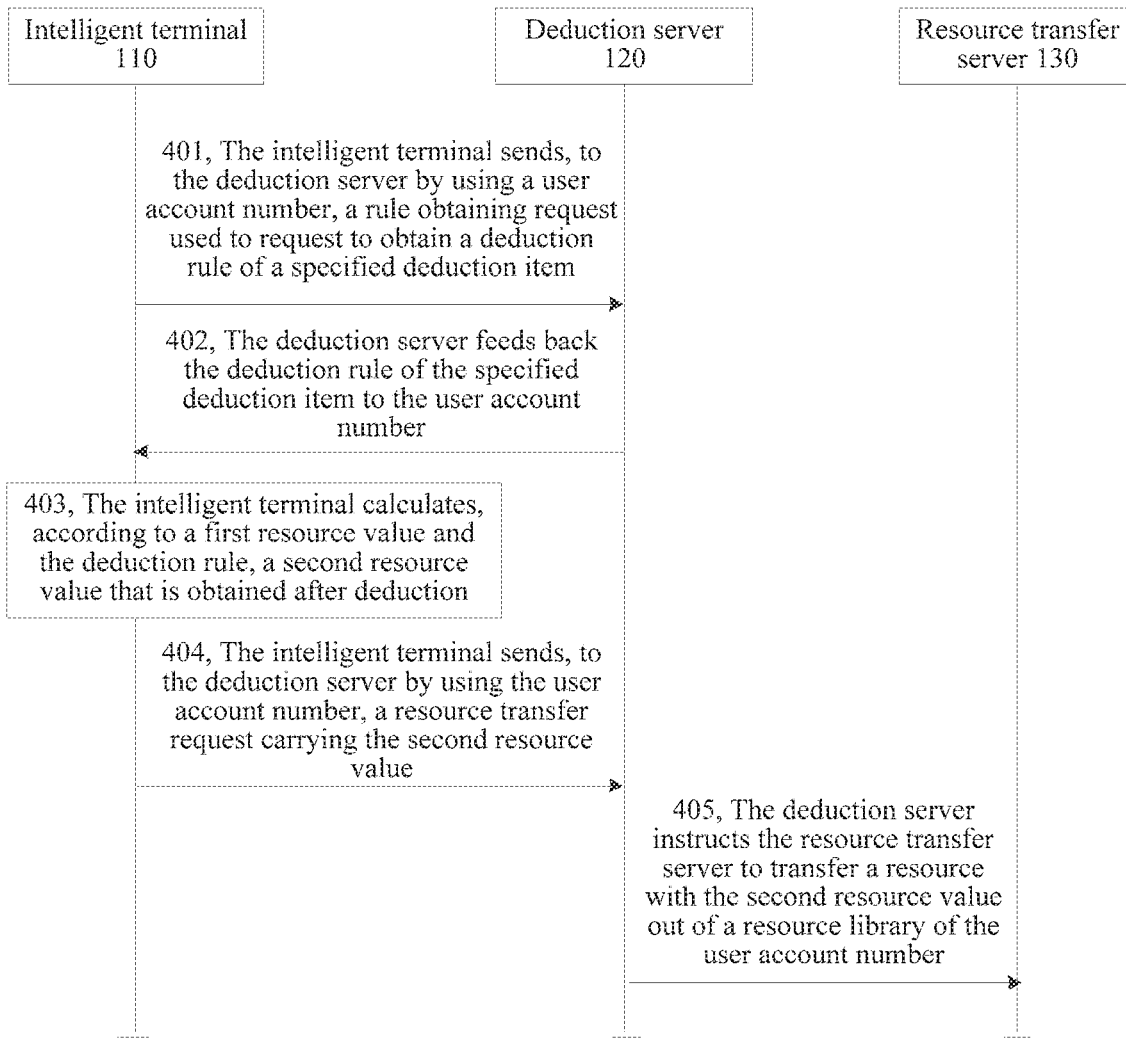
FIG. 4 is a flowchart of a resource deduction method according to another embodiment of the present disclosure.

FIG. 4 is a flowchart of a resource deduction method according to another embodiment of the present disclosure. The resource deduction method is applied to the implementation environment shown in FIG. 1. As shown in FIG. 4, the resource deduction method may include the following operations:

Operation 401: An intelligent terminal sends a rule obtaining request for a deduction rule of a user-specified deduction item to the deduction server.

After a user triggers a user-specified deduction item displayed on the intelligent terminal, the intelligent terminal sends, to the deduction server, the rule obtaining request carrying the deduction rule of the user-specified deduction item. The specified deduction item may be a deduction item triggered by the user, or may be a set of a plurality of deduction items triggered by the user.

The rule obtaining request is used to trigger the deduction server to return the deduction rule of the user-specified deduction item. The specified deduction item includes an account number of a target object provider. The account number of the target object provider is used to prompt the deduction server to query all prestored account numbers of providers for a deduction rule provided by a target object provider corresponding to the account number of the target object provider.

The deduction item described herein may be a coupon, an activity coupon, a voucher, or the like provided by the provider. The deduction item is usually allowed to be spent only at a provider of the deduction item or to be used in a corresponding activity.

Operation 402: The deduction server returns the deduction rule of the user-specified deduction item to the user account identifier.

In addition to the user-specified deduction item, the rule obtaining request further carries a user account identifier of a user. The user account identifier is used to prompt the deduction server to send the found deduction rule of the user-specified deduction item to an intelligent terminal bound to the user account identifier. The deduction rule is used to trigger the user account identifier to calculate a second resource value that is obtained after applying the deduction rule to a first resource value associated with the user-specified deduction item. The first resource value is a resource value of a resource that needs to be transferred when a target object associated with the user-specified deduction item is assigned to the user account identifier.

It should be noted that the resource in this embodiment may be money, a virtual object, a point, or the like. The first resource value and the second resource value are used to measure the quantity of resources. A specific type of the resource is not limited in this embodiment.

Operation 403: The intelligent terminal calculates a second resource value that is obtained after applying the deduction rule to a first resource value associated with the user-specified deduction item.

After receiving the deduction rule, which is returned by the deduction server, of the user-specified deduction item, the intelligent terminal may display a first resource value input interface. After the user inputs the first resource value in the first resource value input interface, the intelligent terminal performs calculation according to the first resource value and the received deduction rule and displays the second resource value that is obtained after the first resource value is deducted. The first resource value is used to indicate the quantity of resources that still need to be transferred when a target object associated with the user-specified deduction item is assigned to the user account identifier. The second resource value is less than the first resource value.

When there are a plurality of specified deduction items, the intelligent terminal calculates the first resource value repeatedly according to an order of using rules provided in the deduction rule.

Operation 404: The intelligent terminal sends a resource transfer request carrying the second resource value to the deduction server.

After the user triggers a resource transfer control displayed on the intelligent terminal, the intelligent terminal sends, to the deduction server, the resource transfer request carrying the user account identifier and the second resource value. The deduction server sends the resource transfer request to a resource transfer server.

It should be noted that the deduction rule of the user-specified deduction item may carry an order number generated according to a predetermined law. The order number is used to identify the resource transfer request.

In some embodiments, the resource transfer request may carry information, such as a user account identifier, an order number, a resource transfer password, and the like.

Operation 405: The deduction server instructs a resource transfer server to transfer a resource of the second resource value out of a resource account of the user account identifier.

After receiving the resource transfer request sent by the intelligent terminal, the deduction server forwards the resource transfer request to the resource transfer server. The user account identifier and the second resource value that is carried by the resource transfer request are used to prompt the resource transfer server to transfer the resource with the second resource value out of the resource account of the user account identifier, and to transfer the resource with the second resource value into the resource account of the target object provider.

To sum up, in the resource deduction method provided in this embodiment of the present disclosure, an intelligent terminal obtains a deduction rule from a deduction server; calculates a second resource value that is obtained after applying the deduction rule to a first resource value associated with the user-specified deduction item; and sends, to the deduction server by using a user account identifier, a resource transfer request carrying the second resource value. The deduction server instructs a resource transfer server to transfer a resource of the second resource value out of a resource account of the user account identifier. The intelligent terminal may automatically calculate, according to a deduction rule of a user-specified deduction item, expense that is obtained after applying the deduction rule to the first resource, and the resource transfer server automatically deducts a resource that needs to be transferred after deduction. Therefore, a problem that a merchant needs to manually calculate expense that is obtained after applying the deduction rule to the first resource, and payment efficiency is relatively low is resolved; expense that is obtained after applying the deduction rule to the first resource is automatically calculated by using an intelligent terminal, and payment efficiency is improved.

Figure 5A:
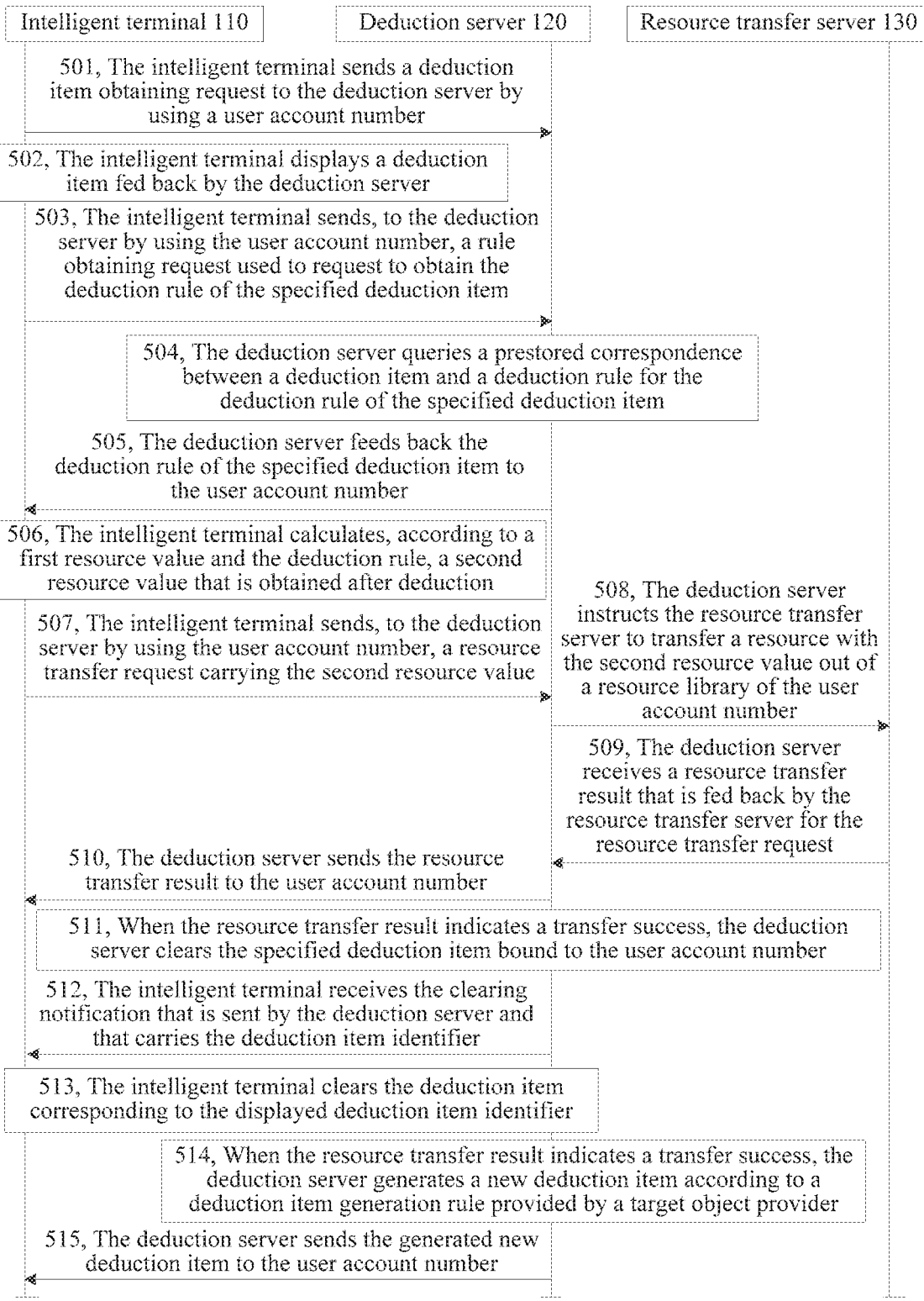
FIG. 5A is a flowchart of a resource deduction method according to still another embodiment of the present disclosure.

In a possible implementation manner, when the intelligent terminal establishes a connection to the deduction server, referring to FIG. 5A, FIG. 5A is a flowchart of a resource deduction method according to still another embodiment of the present disclosure. As shown in FIG. 5A, the resource deduction method may include the following operations:

Operation 501: An intelligent terminal sends a deduction item obtaining request to a deduction server by using a user account identifier. In some embodiments, the deduction item obtaining request also includes the current location of the intelligent terminal so that the deduction server can return location-based information to the intelligent terminal.

After a user account identifier of a user is bound to the intelligent terminal, the intelligent terminal may send, to the deduction server, a deduction item obtaining request carrying the user account identifier of the user. The deduction item obtaining request is used to trigger the deduction server to return a deduction item that can be used by the user account identifier at each provider.

Operation 502: The intelligent terminal displays one or more deduction items returned by the deduction server.

In some embodiments, the intelligent terminal may display, by groups divided according to providers, deduction items returned by the deduction server, that is, each group includes all deduction items provided by only one provider.

Figure 5B:
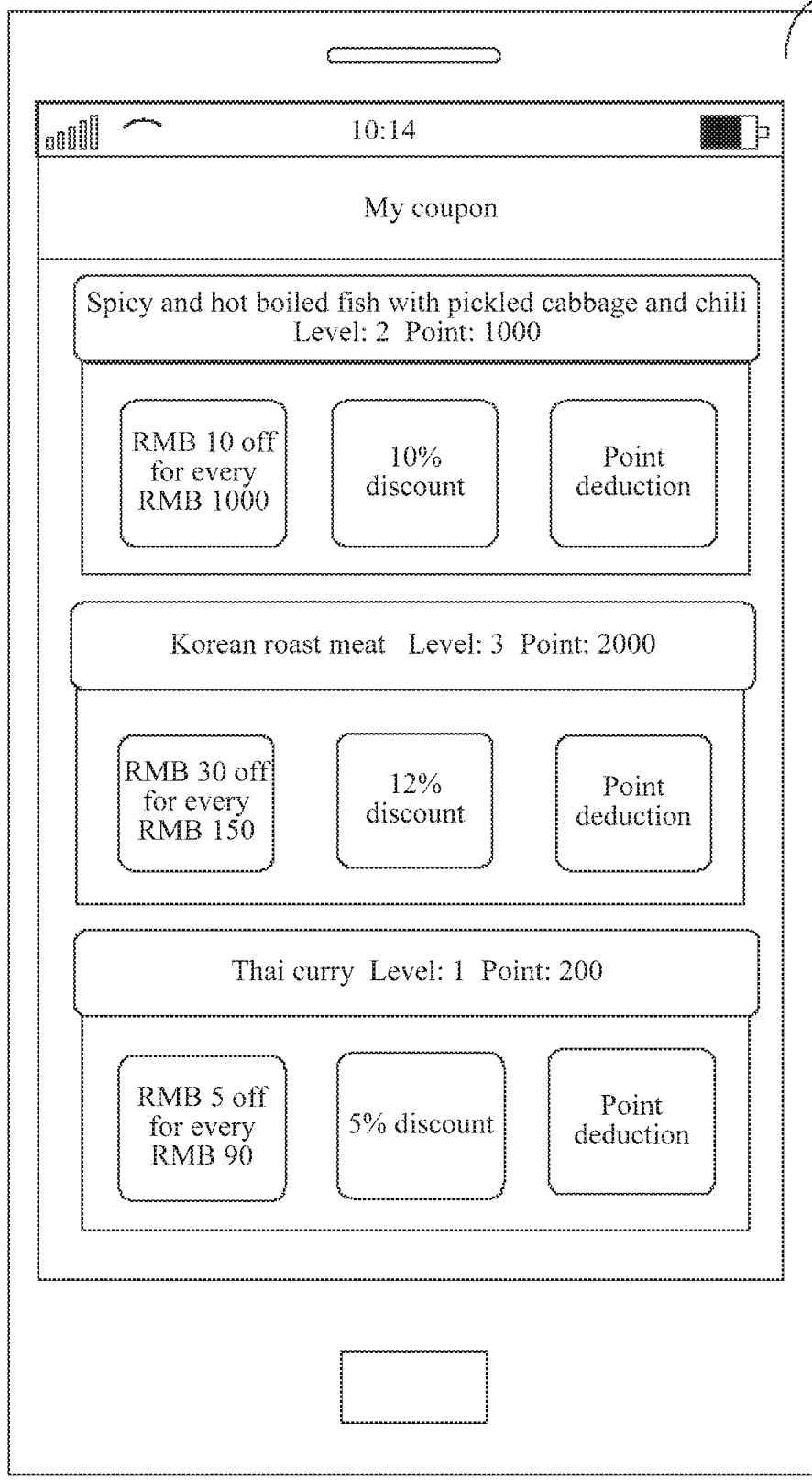
FIG. 5B is a schematic diagram of a deduction item display interface according to an embodiment of the present disclosure.

FIG. 5B is a schematic diagram of a deduction item display interface according to an embodiment of the present disclosure. As shown in FIG. 5B, an intelligent terminal 10 displays deduction items that can be used by providers that are "Spicy and hot boiled fish with pickled cabbage and chili", "Korean roast meat", and "Thai curry", and a user level and a user point of a user at each provider.

In some embodiments, a manner of displaying providers is displaying the providers after the providers are arranged according to an actual distance between a provider address and a current location of a user, a user evaluation fraction, user consumption times, or the like, and the manner of displaying providers are not limited in this embodiment.

In some embodiments, a manner of displaying deduction items may be displaying the deduction items after the deduction items are arranged according to types of the deduction items, deduction amplitude, or the like. The manner of displaying deduction items are not limited in this embodiment.

Operation 503: The intelligent terminal sends, to the deduction server by using the user account identifier, a rule obtaining request used to request to obtain the deduction rule of the user-specified deduction item.

Operation 504: The deduction server queries a prestored correspondence between a deduction item and a deduction rule for the deduction rule of the user-specified deduction item.

After the deduction server receives the rule obtaining request that is sent by the intelligent terminal and that is used to request to obtain the deduction rule of the user-specified deduction item, the deduction server first queries, according to an account number of a target object provider included in the user-specified deduction item, a prestored correspondence between a deduction item and a deduction rule of the target object provider for the deduction rule of the user-specified deduction item. The correspondence is provided by the target object provider to the deduction server in advance.

Operation 505: The deduction server returns the deduction rule of the user-specified deduction item to the user account identifier.

Operation 506: The intelligent terminal calculates a second resource value that is obtained after applying the deduction rule to a first resource value associated with the user-specified deduction item.

Preferably, a type of the deduction rule may be a cash off rule, a level deduction rule, a point deduction rule, or the like. Deduction rules of different types include different calculation formulas. Therefore, the intelligent terminal may perform corresponding calculation according to the deduction rules of different types by using the included calculation formulas. FIG. 5C is a flowchart of calculation methods corresponding to different types of deduction rules according to an embodiment of the present disclosure. As shown in FIG. 5C, the deduction rules of different types may correspond to the following three calculation methods.

Operation 506a: Subtract, if the deduction rule includes a third resource value and a deduction value that are restricted by a cash off deduction formula, when the first resource value is greater than the third resource value in the cash off deduction formula, the deduction value from the first resource value, to obtain a first candidate of the second resource value.

For example, it is assumed that a third resource value is 30 and the deduction value is 10. When the deduction rule received by the intelligent terminal includes the third resource value and the deduction value, if the first resource value is 50, because the first resource value is greater than the third resource value (50>30), the intelligent terminal automatically subtracts the deduction value from the first resource value (50−10), to obtain the second resource value 40.

Operation 506b: Multiply, if the deduction rule includes a discount restriction condition and a first discount coefficient, when a user level of the user account identifier at a target object provider meets the discount restriction condition, the first resource value by the first discount coefficient, to obtain a second candidate of the second resource value, where the discount coefficient is less than 1.

For example, it is assumed that the discount restriction condition is 3 and the first discount coefficient is 0.8. When the deduction rule received by the intelligent terminal includes the discount restriction condition and the first discount coefficient, if the user level of the user at the target object provider is 3, the user level reaches the discount restriction condition. If the first resource value is 50, the intelligent terminal automatically multiplies the first resource value by the first discount coefficient (50*0.8), to obtain the second resource value 40.

Operation 506c: Multiply, if the deduction rule includes a point deduction condition and a second discount coefficient, when both the first resource value and a user point of the user account identifier at a target object provider meet the point deduction condition, the user point by the second discount coefficient, record an obtained product as a deduction value, and subtract the deduction value from the first resource value, to obtain a third candidate of the second resource value.

The point deduction condition described herein is that a user point can be calculated only when the user point of a user account identifier at a target object provider needs to reach a predetermined value and the first resource value needs to reach a predetermined value, so as to obtain a deduction value.

For example, it is assumed that the point deduction condition is that user points of the user account identifier at the target object provider reach 100, the first resource value reaches 50, and the second discount coefficient is 0.1. When the deduction rule received by the intelligent terminal includes the point deduction condition and the second discount coefficient, if the user points of the user account identifier at the target object provider are 100, the user points reach the discount restriction condition. If the first resource value is 50, the intelligent terminal automatically multiplies the first resource value by the first discount coefficient (50*0.8), to obtain the second resource value 40.

In some embodiments, the multiple candidate second resource values are calculated according to different deduction rules and displayed to the user of the intelligent terminal so that the user can choose one of them for a particular transaction. In some other embodiments, the minimum of the multiple candidate second resource values is automatically selected as the calculated second resource value.

Operation 507: The intelligent terminal sends a resource transfer request carrying the second resource value to the deduction server.

Operation 508: The deduction server instructs a resource transfer server to transfer a resource of the second resource value out of a resource account of the user account identifier.

Operation 509: The deduction server receives a resource transfer result that is returned by the resource transfer server for the resource transfer request.

The resource transfer result described herein includes two results: One is a success and the other is a failure. When a resource value in the resource account of the user account identifier does not reach the second resource value, the target object provider deletes the user-specified deduction item, a password for transferring a resource value out is incorrectly input, and in other cases, the deduction server receives the resource transfer result being a failure.

When the deduction server receives the resource transfer result being a failure, it indicates that the resource with the second resource value is not transferred out, and the user-specified deduction item is not used. Therefore, the deduction server directly sends the resource transfer result to the intelligent terminal bound to the user account identifier.

Operation 510: The deduction server sends the resource transfer result to the user account identifier.

The resource transfer result is used to trigger the intelligent terminal at which the user account identifier is located to display the resource transfer result.

Figure 5D:
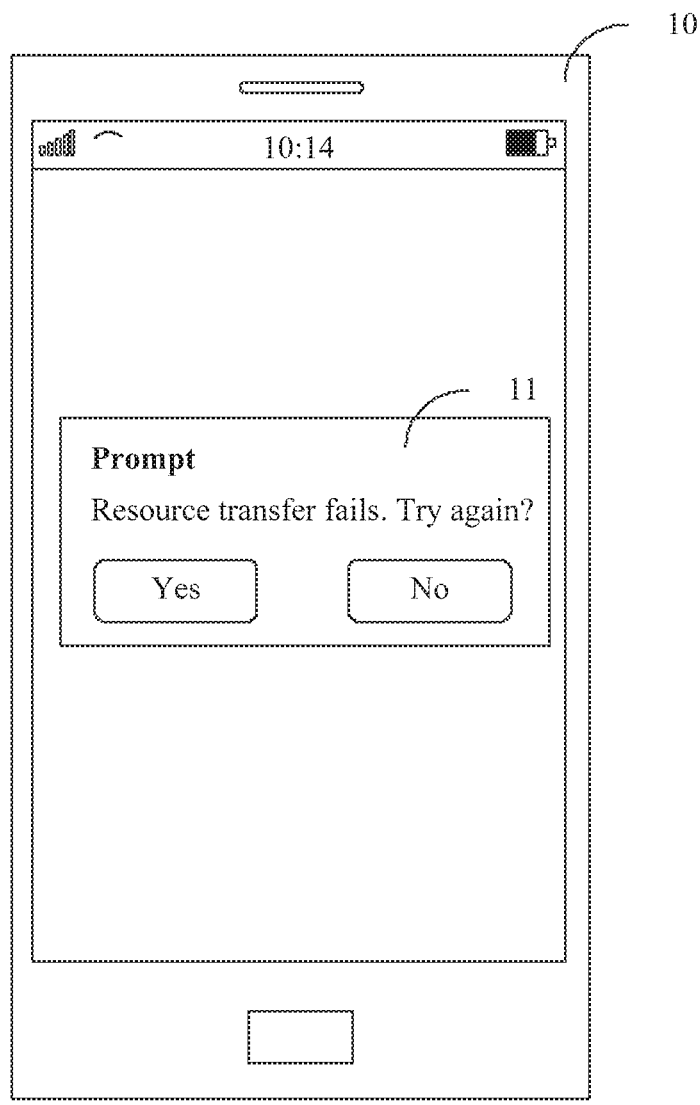
FIG. 5D is a schematic diagram of an interface on which a resource transfer result is a failure according to an embodiment of the present disclosure.
Figure 5E:
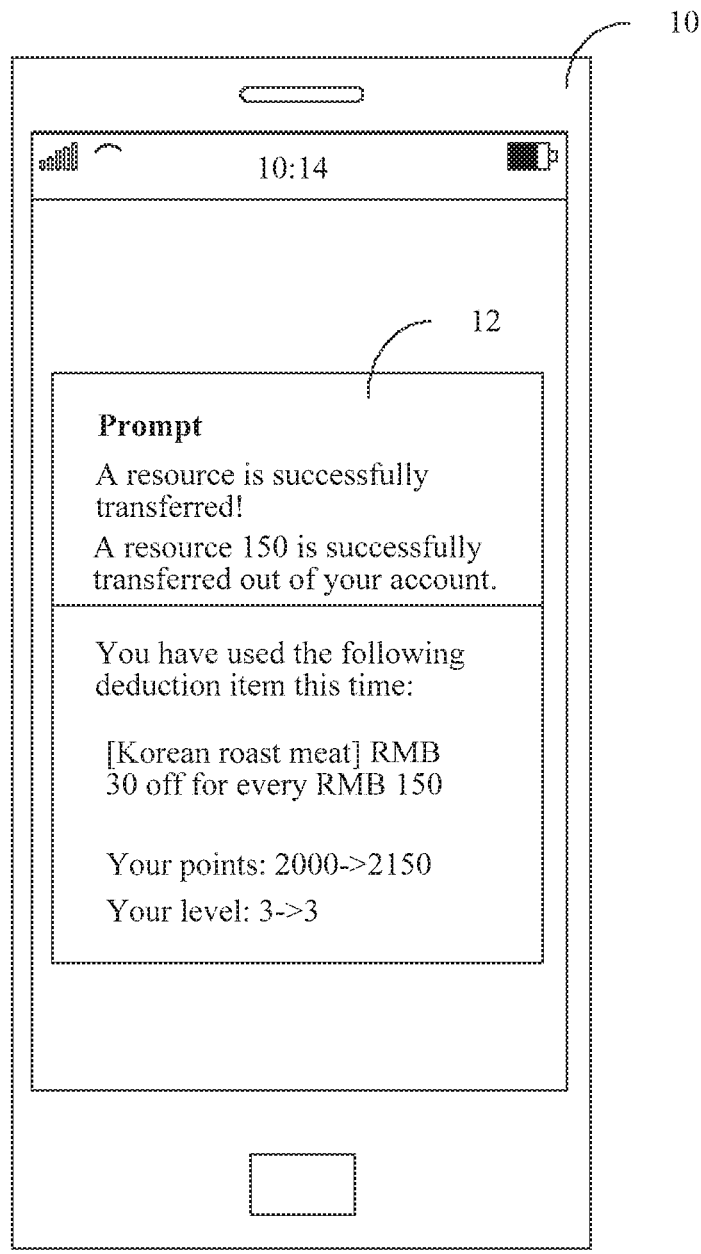
FIG. 5E is a schematic diagram of an interface on which a resource transfer result is a success according to an embodiment of the present disclosure.

FIG. 5D is a schematic diagram of an interface on which a resource transfer result is a failure according to an embodiment of the present disclosure. As shown in FIG. 5D, when the deduction server receives the resource transfer result being a failure, the intelligent terminal 10 displays an interface 11 on which the resource transfer result is a failure. FIG. 5E is a schematic diagram of an interface on which a resource transfer result is a success according to an embodiment of the present disclosure. As shown in FIG. 5E, when the deduction server receives the resource transfer result being a success, the intelligent terminal 10 displays an interface 12 on which the resource transfer result is a success.

Operation 511: When the resource transfer result indicates a transfer success, the deduction server clears the user-specified deduction item bound to the user account identifier.

When the deduction server receives the resource transfer result being a success, it indicates that the resource with the second resource value is already transferred out, and the user-specified deduction item is already used. Therefore, the deduction server automatically deletes a prestored specified deduction item triggered by the user, and sends, to the intelligent terminal bound to the user account identifier, a clearing notification carrying a deduction item identifier.

Operation 512: The intelligent terminal receives the clearing notification that is sent by the deduction server and that carries the deduction item identifier.

After the deduction server clears, from multiple deduction items that are capable of being used by the user account identifier, a deduction item that is already successfully used by the user account identifier, the deduction server sends, to the intelligent terminal, the clearing notification carrying the deduction item identifier. The clearing notification is used to trigger the intelligent device to clear a user-specified deduction item identifier corresponding to the user-specified deduction item, preventing the user from triggering the already used specified deduction item again.

In some embodiments, the intelligent terminal may receive a point change notification and a level change notification, which are sent by the deduction server, of a user account at the target object provider.

Still referring to FIG. 5E, when the resource transfer result indicates a transfer success, in addition to displaying the interface 12 on which the resource transfer result is a success, the intelligent terminal 10 further displays a clearing notification of the deduction item identifier corresponding to the user-specified deduction item, and a point change notification and a level change notification of the user account of the user at the target object provider.

Operation 513: The intelligent terminal clears the user-specified deduction item identifier corresponding to the user-specified deduction item.

Operation 514: When the resource transfer result indicates a transfer success, the deduction server generates a new deduction item according to a deduction item generation rule provided by the target object provider.

Operation 515: The deduction server sends the generated new deduction item to the user account identifier.

The deduction item generation rule described herein is that when the user successfully transfers a resource in the resource account and a resource value of the resource reaches the second resource value and reaches the predetermined value, the new deduction item is sent to the intelligent terminal bound to the user account identifier. For example, assuming that the deduction item generation rule is that the second resource value reaches 100, when the user successfully transfers a resource in the resource account and a resource value of the resource reaches 100, the deduction server generates a new deduction item according to the deduction rule preset by the target object provider, and sends the generated new deduction item to the intelligent terminal bound to the user account identifier. The intelligent terminal displays the new deduction item.

It should be noted that operation 503 and operation 505 to operation 508 are similar to operation 401 to operation 405, and are not described herein again.

To sum up, in the resource deduction method provided in this embodiment of the present disclosure, an intelligent terminal obtains a deduction rule from a deduction server; calculates a second resource value that is obtained after applying the deduction rule to a first resource value associated with the user-specified deduction item; and sends, to the deduction server by using a user account identifier, a resource transfer request carrying the second resource value. The deduction server instructs a resource transfer server to transfer a resource of the second resource value out of a resource account of the user account identifier. The intelligent terminal may automatically calculate, according to a deduction rule of a user-specified deduction item, expense that is obtained after applying the deduction rule to the first resource, and the resource transfer server automatically deducts a resource that needs to be transferred after deduction. Therefore, a problem that a merchant needs to manually calculate expense that is obtained after applying the deduction rule to the first resource, and payment efficiency is relatively low is resolved; expense that is obtained after applying the deduction rule to the first resource is automatically calculated by using an intelligent terminal, and payment efficiency is improved.

In this embodiment, a type of the deduction rule may be a cash off rule, a level deduction rule, a point deduction rule, or the like. Deduction rules of different types include different calculation formulas.

In this embodiment, when the resource transfer result indicates a transfer success, the deduction server clears the user-specified deduction item bound to the user account identifier.

In this embodiment, when the resource transfer result indicates a transfer success, in addition to displaying an interface on which the resource transfer result is a success, the intelligent terminal further displays a clearing notification of the deduction item identifier corresponding to the user-specified deduction item, and a point change notification and a level change notification of the user account of the user at the target object provider.

The following is apparatus embodiments of the present disclosure. For details, which are not specifically described, of the apparatus embodiments, refer to the method embodiments respectively corresponding to the apparatus embodiments.

Figure 6A:
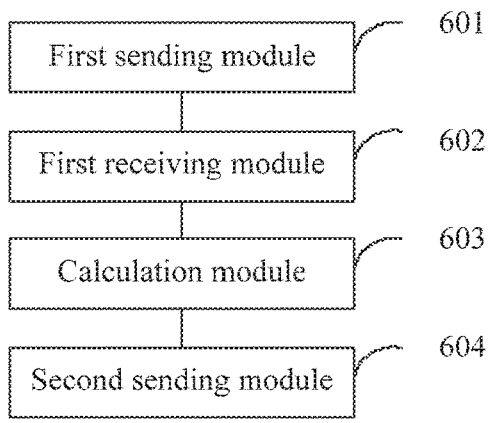
FIG. 6A is a structural block diagram of a resource deduction apparatus according to an embodiment of the present disclosure.

FIG. 6A is a structural block diagram of a resource deduction apparatus according to an embodiment of the present disclosure. The resource deduction apparatus is applied to an intelligent terminal 110, and the intelligent terminal may be a smartphone, a multimedia player, a tablet computer, or the like. As shown in FIG. 6A, the resource deduction apparatus includes: a first sending module 601, a first receiving module 602, a calculation module 603, and a second sending module 604.

The first sending module 601 is configured to send, to a deduction server by using a user account identifier, where a rule obtaining request for a deduction rule of a user-specified deduction item, the rule obtaining request is used to trigger the deduction server to return the deduction rule of the user-specified deduction item.

The first receiving module 602 is configured to receive the deduction rule returned by the deduction server.

The calculation module 603 is configured to calculate, according to a first resource value and the deduction rule that is received by the first receiving module 602, a second resource value that is obtained after applying the deduction rule to the first resource, where the first resource value is used to indicate the quantity of resources that need to be transferred when a target object associated with the user-specified deduction item is assigned to the user account identifier.

The second sending module 604 is configured to send a resource transfer request carrying the second resource value to the deduction server calculated by the calculation module 603, where the resource transfer request is used to trigger the deduction server to instruct a resource transfer server to transfer a resource of the second resource value out of a resource account of the user account identifier.

Figure 6B:
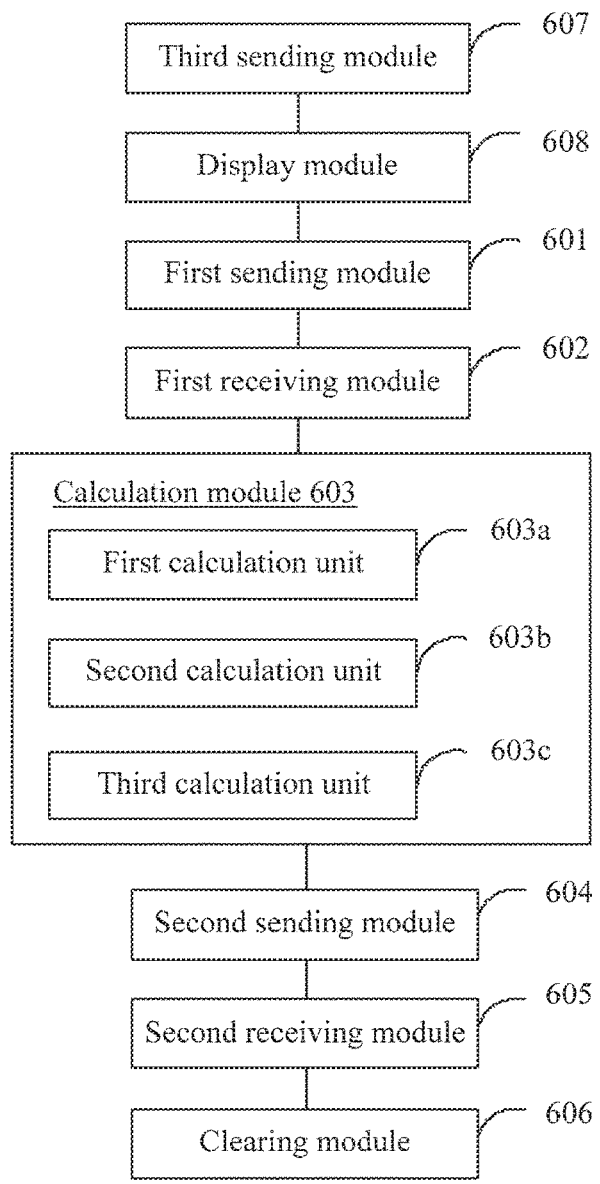
FIG. 6B is a structural block diagram of a resource deduction apparatus according to another embodiment of the present disclosure.

In a possible implementation manner, referring to FIG. 6B, FIG. 6B is a structural block diagram of a resource deduction apparatus according to another embodiment of the present disclosure. The calculation module 603 includes: a first calculation unit 603a, a second calculation unit 603b, and a third calculation unit 603c.

The first calculation unit 603a is configured to subtract, if the deduction rule received by the first receiving module 602 includes a third resource value and a deduction value that are restricted by a cash off deduction formula, when the first resource value is greater than the third resource value in the cash off deduction formula, the deduction value from the first resource value, to obtain a first candidate of the second resource value; and/or the second calculation unit 603b is configured to multiply, if the deduction rule received by the first receiving module 602 includes a discount restriction condition and a first discount coefficient, when a user level of the user account identifier at a target object provider meets the discount restriction condition, the first resource value by the first discount coefficient, to obtain a second candidate of the second resource value, where the discount coefficient is less than 1; and/or the third calculation unit 603c is configured to multiply, if the deduction rule received by the first receiving module 602 includes a point deduction condition and a second discount coefficient, when both the first resource value and a user point of the user account identifier at a target object provider meet the point deduction condition, the user point by the second discount coefficient, record an obtained user point as a deduction value, and subtract the deduction value from the first resource value, to obtain a third candidate of the second resource value.

In a possible implementation manner, still referring to FIG. 6B, the resource deduction apparatus includes: a second receiving module 605 and a clearing module 606.

The second receiving module 605 is configured to receive a clearing notification that is sent by the deduction server and that carries a deduction item identifier, where the clearing notification is sent after the deduction server successfully clears, from multiple deduction items that are capable of being used by the user account identifier, a deduction item that is already successfully used by the user account identifier; and the clearing module 606 is configured to clear a user-specified deduction item identifier corresponding to the user-specified deduction item.

In a possible implementation manner, still referring to FIG. 6B, the resource deduction apparatus includes: a third sending module 607 and a display module 608.

The third sending module 607 is configured to send a deduction item obtaining request to the deduction server by using the user account identifier, where the deduction item obtaining request is used to trigger the deduction server to return a deduction item that is capable of being used by the user account identifier; and the display module 608 is configured to display the updated user-specified deduction item returned by the deduction server. In some embodiments, because of the just completed transaction associated with the user-specified deduction item, the status of the user account identifier at the deduction server may have changed such that the deduction server may associate, e.g., at least one new deduction rule that is newly available to the user account identifier according to the second resource value.

To sum up, the resource deduction apparatus provided in this embodiment of the present disclosure obtains a deduction rule from a deduction server; calculates a second resource value that is obtained after applying the deduction rule to a first resource value associated with the user-specified deduction item; and sends, to the deduction server by using a user account identifier, a resource transfer request carrying the second resource value. The deduction server instructs a resource transfer server to transfer a resource of the second resource value out of a resource account of the user account identifier. An intelligent terminal may automatically calculate, according to a deduction rule of a user-specified deduction item, expense that is obtained after applying the deduction rule to the first resource, and the resource transfer server automatically deducts a resource that needs to be transferred after deduction. Therefore, a problem that a merchant needs to manually calculate expense that is obtained after applying the deduction rule to the first resource, and payment efficiency is relatively low is resolved; expense that is obtained after applying the deduction rule to the first resource is automatically calculated by using an intelligent terminal, and payment efficiency is improved.

In this embodiment, a type of the deduction rule may be further a cash off rule, a level deduction rule, a point deduction rule, or the like. Deduction rules of different types include different calculation formulas.

In this embodiment, when the resource transfer result indicates a transfer success, in addition to displaying an interface on which the resource transfer result is a success, the intelligent terminal further displays a clearing notification of the deduction item identifier corresponding to the user-specified deduction item, and a point change notification and a level change notification of the user account of the user at the target object provider.

Figure 7A:
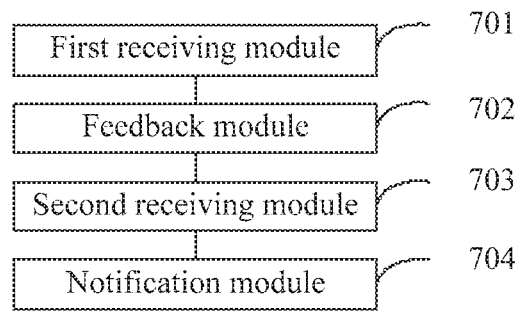
FIG. 7A is a structural block diagram of a resource deduction apparatus according to an embodiment of the present disclosure.

FIG. 7A is a structural block diagram of a resource deduction apparatus according to an embodiment of the present disclosure. The resource deduction apparatus is applied to a deduction server 120. As shown in FIG. 7A, the resource deduction apparatus includes: a first receiving module 701, a feedback module 702, a second receiving module 703, and a notification module 704.

The first receiving module 701 is configured to receive a rule obtaining request that is sent by using a user account identifier and that is used to request to obtain a deduction rule of a user-specified deduction item;

the feedback module 702 is configured to return the deduction rule of the user-specified deduction item to the user account identifier, where the deduction rule is used to trigger the user account identifier to calculate a second resource value that is obtained after applying the deduction rule to a first resource value associated with the user-specified deduction item, and the first resource value is a resource value of a resource needing to be transferred when a target object associated with the user-specified deduction item is assigned to the user account identifier;

the second receiving module 703 is configured to receive a resource transfer request that is sent by the user account identifier and that carries the second resource value returned by the feedback module 702; and the notification module 704 is configured to instruct a resource transfer server to transfer a resource of the second resource value out of a resource account of the user account identifier.

Figure 7B:
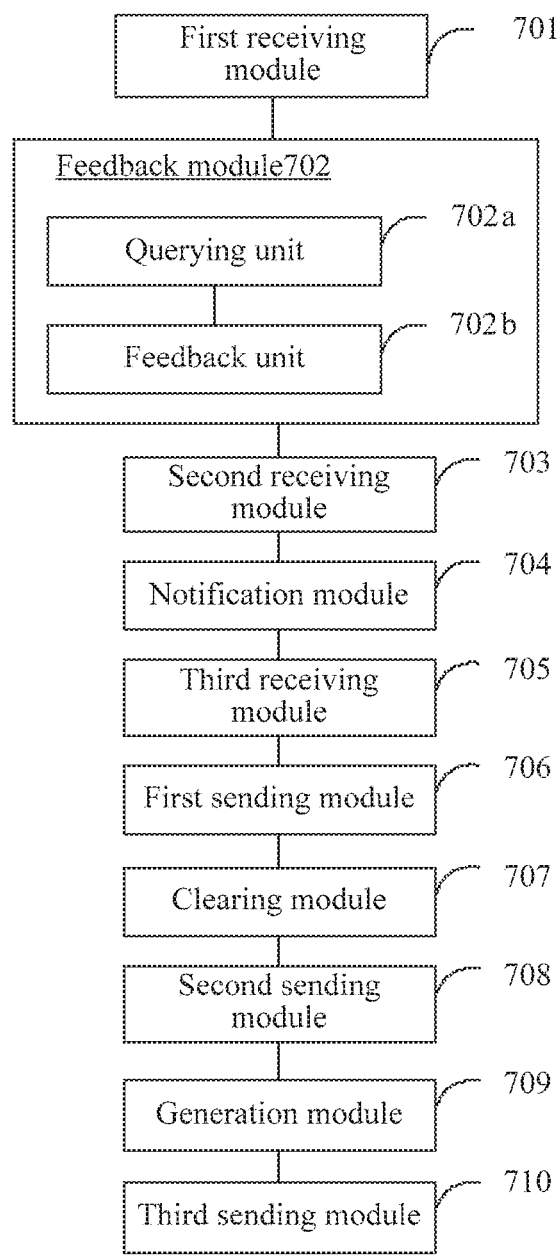
FIG. 7B is a structural block diagram of a resource deduction apparatus according to another embodiment of the present disclosure.

In a possible implementation manner, referring to FIG. 7B, FIG. 7B is a structural block diagram of a resource deduction apparatus according to another embodiment of the present disclosure. The feedback module 702 includes: a querying unit 702a and a feedback unit 702b.

The querying unit 702a is configured to query a prestored correspondence between a deduction item and a deduction rule for the deduction rule of the user-specified deduction item, where the correspondence is provided by a target object provider to the deduction server in advance; and the feedback unit 702b is configured to return the deduction rule, which is queried for by the querying unit 702a, of the user-specified deduction item to the user account identifier.

In a possible implementation manner, still referring to FIG. 7B, the resource deduction apparatus includes: a third receiving module 705 and a first sending module 706.

The third receiving module 705 is configured to receive a resource transfer result that is returned by the resource transfer server for the resource transfer request; and the first sending module 706 is configured to send the resource transfer result received by the third receiving module 705 to the user account identifier, where the resource transfer result is used to trigger an intelligent terminal at which the user account identifier is located to display the resource transfer result.

In a possible implementation manner, still referring to FIG. 7B, the resource deduction apparatus includes: a clearing module 707 and a second sending module 708.

The clearing module 707 is configured to clear, when the resource transfer result indicates a transfer success, the user-specified deduction item bound to the user account identifier; and the second sending module 708 is configured to send a clearing notification to the user account identifier, where the clearing notification carries a deduction item identifier of the cleared deduction item, and the clearing notification is used to trigger the user account identifier to clear the user-specified deduction item identifier corresponding to the user-specified deduction item.

In a possible implementation manner, still referring to FIG. 7B, the resource deduction apparatus includes: a generation module 709 and a third sending module 710.

The generation module 709 is configured to generate, when the resource transfer result indicates a transfer success, a new deduction item according to a deduction item generation rule provided by the target object provider; and the third sending module 709 is configured to send the new deduction item generated by the generation module 709 to the user account identifier.

To sum up, the resource deduction apparatus provided in this embodiment of the present disclosure sends a deduction rule to an intelligent terminal, so that the intelligent terminal calculates a second resource value according to the deduction rule, and instructs a resource transfer server to transfer a resource with the second resource value out of a resource account of a user account identifier bound to the intelligent terminal. A deduction server may send a deduction rule of a user-specified deduction item to the intelligent terminal, the intelligent terminal automatically calculates expense that is obtained after applying the deduction rule to the first resource, and the resource transfer server automatically deducts a resource that needs to be transferred after deduction. Therefore, a problem that a merchant needs to manually calculate expense that is obtained after applying the deduction rule to the first resource, and payment efficiency is relatively low is resolved; expense that is obtained after applying the deduction rule to the first resource is automatically calculated by using an intelligent terminal, and payment efficiency is improved.

In this embodiment, when the resource transfer result indicates a transfer success, the deduction server clears the user-specified deduction item bound to the user account identifier.

Figure 8:
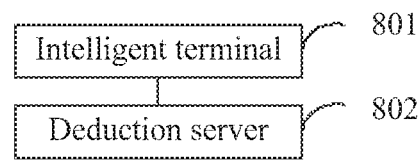
FIG. 8 is a block diagram of a resource deduction system according to an embodiment of the present disclosure.

FIG. 8 is a block diagram of a resource deduction system according to an embodiment of the present disclosure. As shown in FIG. 8, the resource deduction system is applied to the implementation environment shown in FIG. 1. The resource deduction system may include: an intelligent terminal 801 and a deduction server 802.

The intelligent terminal 801 includes the resource deduction apparatus described in FIG. 6A and FIG. 6B. For details, refer to the descriptions in FIG. 6A and FIG. 6B. Details are not described herein again.

The deduction server 802 may include the resource deduction apparatus described in FIG. 7A and FIG. 7B. For details, refer to the descriptions in FIG. 7A and FIG. 7B. Details are not described herein again.

To sum up, in the resource deduction system provided in this embodiment of the present disclosure, an intelligent terminal obtains a deduction rule from a deduction server; calculates a second resource value that is obtained after applying the deduction rule to a first resource value associated with the user-specified deduction item; and sends, to the deduction server by using a user account identifier, a resource transfer request carrying the second resource value. The deduction server instructs a resource transfer server to transfer a resource of the second resource value out of a resource account of the user account identifier. The intelligent terminal may automatically calculate, according to a deduction rule of a user-specified deduction item, expense that is obtained after applying the deduction rule to the first resource, and the resource transfer server automatically deducts a resource that needs to be transferred after deduction. Therefore, a problem that a user cannot pay the merchant expense that is obtained after applying the deduction rule to the first resource until the merchant needs to first perform calculation of deduction and offset by using a coupon or a membership card, and payment efficiency is relatively low is resolved: expense that is obtained after applying the deduction rule to the first resource is automatically calculated, and payment efficiency is improved.

It should be further noted that, when the resource deduction apparatus provided in the embodiment deducts a resource, only divisions of the function modules are used as an example for description. In an actual application, the foregoing functions may be allocated to and completed by different function modules as required, that is, internal structures of the intelligent terminal and the deduction server are divided into different function modules, to complete all or some of the functions described above. In addition, the resource deduction apparatus and the resource deduction method that are provided in the embodiments belong to a same concept. For specific implementation processes of the resource deduction apparatus and the resource deduction method, refer to the method embodiments, and details are not described herein again.

Figure 9:
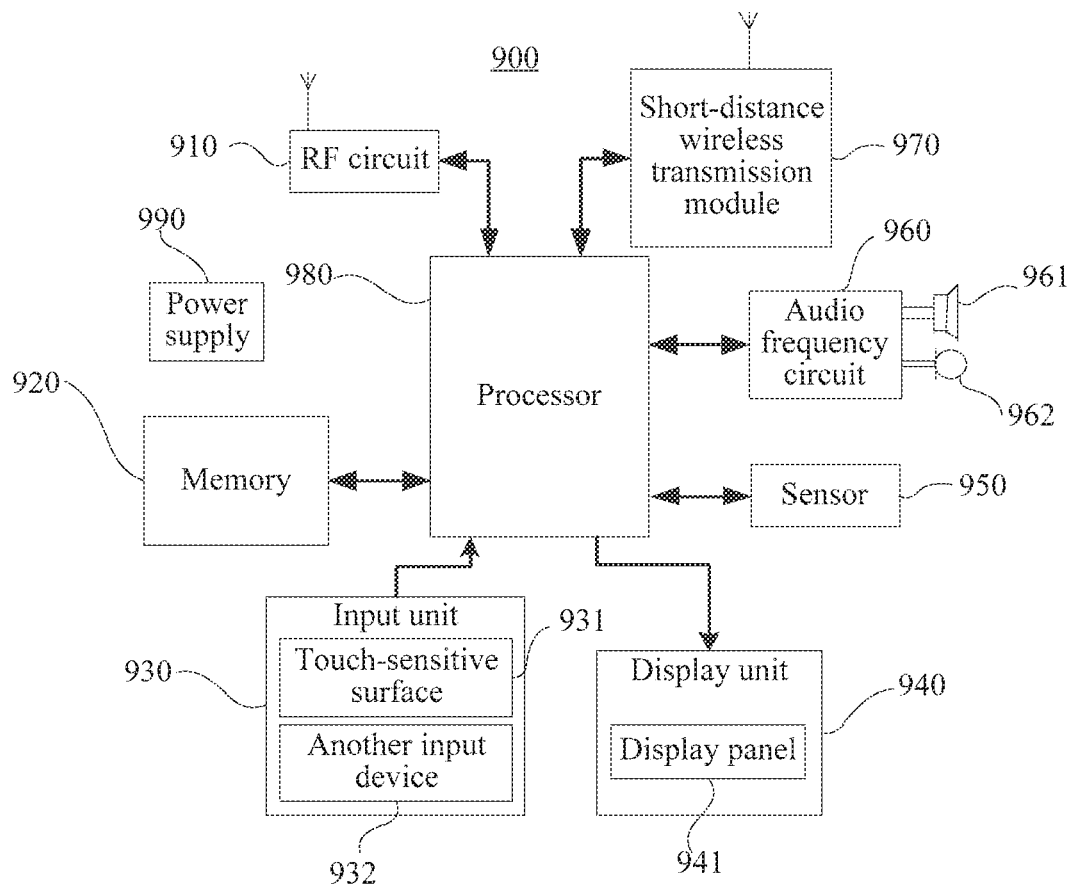
FIG. 9 is a schematic structural diagram of a terminal according to an embodiment of the present disclosure.

FIG. 9 is a schematic structural diagram of an intelligent terminal according to an embodiment of the present disclosure. The intelligent terminal 900 may be configured to run a client. Specifically:

The intelligent terminal 900 may include components, such as a radio frequency (RF) circuit 910, a memory 920 including one or more computer readable storage media, an input unit 930, a display unit 940, a sensor 950, an audio frequency circuit 960, a short-distance wireless transmission module 970, a processor 980 including one or more processing cores, and a power supply 990. A person skilled in the art may understand that the intelligent terminal structure shown in FIG. 9 does not constitute any limitation to the intelligent terminal, and may include more components or fewer components than those shown in the figure, or some components may be combined, or a different component deployment may be used.

The RF circuit 910 may be configured to receive and send a signal during an information receiving and sending process or a conversation process. Specifically, after receiving downlink information from a base station, the RF circuit 910 delivers the downlink information to one or more processors 980 for processing, and sends related uplink data to the base station. Generally, the RF circuit 910 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 910 may also communicate with a network and another device by means of wireless communication. The wireless communication may use any communications standard or protocol, which includes, but is not limited to, a Global System for Mobile communications (GSM), a General Packet Radio Service (GPRS), Code Division Multiple Access (CDMA), Wideband Code Division Multiple Access (WCDMA), Long Term Evolution (LTE), e-mail, Short Messaging Service (SMS), and the like. The memory 920 may be configured to store a software program and a module. For example, the memory 920 may be configured to store a preset time list, may be configured to store a software program used to collect a voice signal, a software program for identifying a keyword, a software program for identifying continuous voice, and a software program for setting a reminding item, or may be configured to store a binding relationship between a wireless access point and a user account identifier, and the like. The processor 980 runs the software program and module stored in the memory 920, to implement various functional applications and data processing. The memory 920 may mainly include a program storage area and a data storage area. The program storage area may store an operating system, an application program required by at least one function (such as a sound playback function, an image display function, and a touchscreen identification function), and the like. The data storage area may store data created according to use of the intelligent terminal 900. In addition, the memory 920 may include a high speed random access memory (RAM), and may also include a non-volatile memory, such as at least one magnetic disk storage device, a flash memory, or another volatile solid storage device. Accordingly, the memory 920 may further include a memory controller, so that the processor 980 and the input unit 930 access the memory 920.

The input unit 930 may be configured to receive input digit or character information, and generate keyboard, mouse, joystick, optical, or track ball signal input related to the user setting and function control. Specifically, the input unit 930 may include a touch-sensitive surface 931 and another input device 932. The touch-sensitive surface 931 may also be referred to as a touchscreen or a touch panel, and may collect a touch operation of a user on or near the touch-sensitive surface (such as an operation of a user on or near the touch-sensitive surface 931 by using any suitable object or attachment, such as a finger or a touch pen), and drive a corresponding connection apparatus according to a preset program. In some embodiments, the touch-sensitive surface 931 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 980. Moreover, the touch controller can receive and execute a command sent by the processor 980. In addition, the touch-sensitive surface 931 may be implemented by using various types, such as a resistive type, a capacitance type, an infrared type, and a surface sound wave type. In addition to the touch-sensitive surface 931, the input unit 930 may further include the another input device 932. Specifically, the another input device 932 may include, but is not limited to, one or more of a physical keyboard, a functional key (such as a volume control key or a switch key), a track ball, a mouse, and a joystick.

The display unit 940 may be configured to display information input by the user or information provided for the user, and various graphical user interfaces of the intelligent terminal 900. The graphical user interfaces may be formed by a graph, a text, an icon, a video, and any combination thereof. The display unit 940 may include a display panel 941. In some embodiments, the display panel 941 may be configured by using a liquid crystal display (LCD), an organic light-emitting diode (OLED), or the like. Further, the touch-sensitive surface 931 may cover the display panel 941. After detecting a touch operation on or near the touch-sensitive surface 931, the touch-sensitive surface 931 transfers the touch operation to the processor 980, so as to determine a type of a touch event. Then, the processor 980 provides corresponding visual output on the display panel 941 according to the type of the touch event. Although, in FIG. 9, the touch-sensitive surface 931 and the display panel 941 are used as two separate parts to implement input and output functions, in some embodiments, the touch-sensitive surface 931 and the display panel 941 may be integrated to implement the input and output functions.

The intelligent terminal 900 may further include at least one sensor 950, such as an optical sensor, a motion sensor, and other sensors. Specifically, the optical sensor may include an ambient light sensor and a proximity sensor. The ambient light sensor may adjust luminance of the display panel 941 according to brightness of the ambient light. The proximity sensor may switch off the display panel 941 and/or backlight when the intelligent terminal device 900 is moved to the ear. As one type of motion sensor, a gravity acceleration sensor may detect magnitude of accelerations at various directions (which generally are triaxial), may detect magnitude and a direction of the gravity when static, and may be configured to identify an application of a mobile phone gesture (such as switchover between horizontal and vertical screens, a related game, and gesture calibration of a magnetometer), a related function of vibration identification (such as a pedometer and a knock). Other sensors, such as a gyroscope, a barometer, a hygrometer, a thermometer, and an infrared sensor, which may be configured in the intelligent terminal 900 are not further described herein.

The audio circuit 960, a loudspeaker 961, and a microphone 962 may provide audio interfaces between the user and the intelligent terminal 900. The audio circuit 960 may transmit, to the loudspeaker 961, a received electrical signal converted from received audio data. The loudspeaker 961 converts the electrical signal into a sound signal for output. On the other hand, the microphone 962 converts a collected sound signal into an electrical signal. The audio circuit 960 receives the electrical signal and converts the electrical signal into audio data, and outputs the audio data to the processor 980 for processing. Then, the processor 980 sends the audio data to another mobile terminal device by using the RF circuit 910, or outputs the audio data to the memory 920 for further processing. The audio circuit 960 may further include an earplug jack, so as to provide communication between a peripheral earphone and the intelligent terminal 900.

The short-distance wireless transmission module 970 may be a wireless fidelity (WiFi) module, a Bluetooth module, or the like. The intelligent terminal device 900 may help, by using the short-distance wireless transmission module 970, a user to receive and send an e-mail, browse a webpage, and access stream media, and the like, which provides wireless broadband Internet access for the user. Although FIG. 9 shows the short-distance wireless transmission module 970, it may be understood that, the short-distance wireless transmission module 970 does not belong to a necessary constitution of the intelligent terminal 900, and can be ignored according to demands without changing the scope of the essence of the present disclosure.

The processor 980 is a control center of the intelligent terminal 900, and connects to various parts of the entire mobile terminal by using various interfaces and lines. By running or executing the software program and/or module stored in the memory 920, and invoking data stored in the memory 920, the processor 980 performs various functions and data processing of the intelligent terminal 900, thereby performing overall monitoring on the mobile terminal. In some embodiments, the processor 980 may include one or more processing cores. In some embodiments, the processor 980 may integrate an application processor and a modem processor. The application processor mainly processes an operating system, a user interface, an application program, and the like. The modem processor mainly processes wireless communication. It may be understood that, the foregoing modem processor may also not be integrated into the processor 980.

The intelligent terminal 900 further includes the power supply 990 (such as a battery) for supplying power to the components. Preferably, the power supply may logically connect to the processor 980 by using a power supply management system, thereby implementing functions, such as charging, discharging, and power consumption management, by using the power supply management system. The power supply 990 may further include any component, such as one or more direct current or alternate current power supplies, a re-charging system, a power supply fault detection circuit, a power supply converter or an inverter, and a power supply state indicator.

Although not shown in the figure, the intelligent terminal 900 may further include a camera, a Bluetooth module, and the like, and details are not further described herein.

The intelligent terminal 900 further includes a memory and one or more programs. The one or more programs are stored in the memory, and are configured to be executed by one or more processors. The one or more programs include instructions used to perform the following operations:

sending a rule obtaining request for a deduction rule of a user-specified deduction item to the deduction server, where the rule obtaining request is used to trigger the deduction server to return the deduction rule of the user-specified deduction item; receiving the deduction rule returned by the deduction server; calculating a second resource value that is obtained after applying the deduction rule to a first resource value associated with the user-specified deduction item, where the first resource value is used to indicate the quantity of resources that need to be transferred when a target object associated with the user-specified deduction item is assigned to the user account identifier; and sending a resource transfer request carrying the second resource value to the deduction server, where the resource transfer request is used to trigger the deduction server to instruct a resource transfer server to transfer a resource of the second resource value out of a resource account of the user account identifier.

In some embodiments, the one or more programs further include instructions used to perform the following operations:

subtracting, if the deduction rule includes a third resource value and a deduction value that are restricted by a cash off deduction formula, when the first resource value is greater than the third resource value in the cash off deduction formula, the deduction value from the first resource value, to obtain a first candidate of the second resource value; and/or multiplying, if the deduction rule includes a discount restriction condition and a first discount coefficient, when a user level of the user account identifier at a target object provider meets the discount restriction condition, the first resource value by the first discount coefficient, to obtain a second candidate of the second resource value, where the discount coefficient is less than 1; and/or multiplying, if the deduction rule includes a point deduction condition and a second discount coefficient, when both the first resource value and a user point of the user account identifier at a target object provider meet the point deduction condition, the user point by the second discount coefficient, recording an obtained product as a deduction value, and subtracting the deduction value from the first resource value, to obtain a third candidate of the second resource value.

In some embodiments, the one or more programs further include instructions used to perform the following operations:

receiving a clearing notification that is sent by the deduction server and that carries a deduction item identifier, where the clearing notification is sent after the deduction server successfully clears, from multiple deduction items that are capable of being used by the user account identifier, a deduction item that is already successfully used by the user account identifier; and clearing a user-specified deduction item identifier corresponding to the user-specified deduction item.

In some embodiments, the one or more programs further include instructions used to perform the following operations:

sending a deduction item obtaining request to the deduction server by using the user account identifier, where the deduction item obtaining request is used to trigger the deduction server to return a deduction item that is capable of being used by the user account identifier; and displaying the updated user-specified deduction item returned by the deduction server.

In an exemplary embodiment, a non-transitory computer readable storage medium including instructions is further provided, for example, a memory including instructions. The instructions may be executed by the processor of the intelligent terminal, to perform the resource deduction method. For example, the non-temporary computer readable storage medium may be a read-only memory (ROM), a RAM, a CD-ROM, a magnetic disk, a floppy disk, or an optical data storage device.

Figure 10:
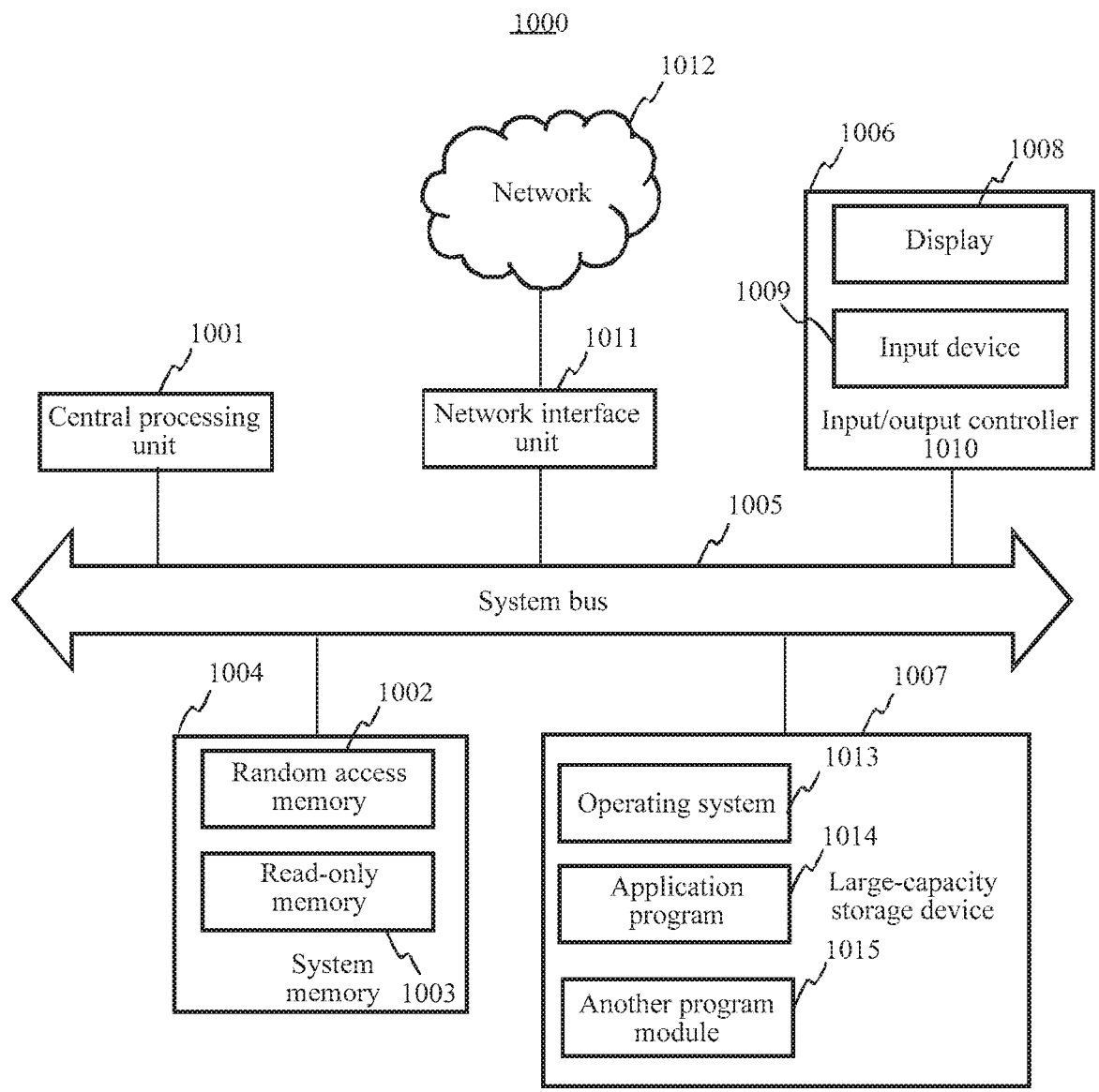
FIG. 10 is a schematic structural diagram of a server according to an embodiment of the present disclosure.

FIG. 10 is a schematic structural diagram of a server according to an embodiment of the present disclosure. In some embodiments, the server 1000 may be a deduction server 120, or a set of a deduction server 120 and a resource transfer server 130. Specifically:

The server 1000 includes a central processing unit (CPU) 1001, a system memory 1004 including a RAM) 1002 and a ROM 1003, and a system bus 1005 connecting the system memory 1004 and the CPU 1001. The server 1000 further includes a basic input/output (I/O) system 1006 helping devices in a computer to transmit information, and a large-capacity storage device 1007 that is configured to store an operating system 1013, an application program 1014, and another program module 1015.

The basic input/output system 1006 includes a display 1008 configured to display information and an input device 1009 such as a mouse or a keyboard that is used by a user to input information. The display 1008 and the input device 1009 are both connected to the CPU 1001 by using an I/O controller 1010 connected to the system bus 1005. The basic I/O system 1006 may further include the I/O controller 1010, so as to receive and process input from multiple other devices, such as a keyboard, a mouse, and an electronic stylus. Similarly, the I/O controller 1010 further provides a display, a printer, or another type of output device.

The large-capacity storage device 1007 is connected to the CPU 1001 by using a large-capacity storage controller (not shown) connected to the system bus 1005. The large-capacity storage device 1007 and a computer readable medium relevant to the large-capacity storage device provide non-volatile storage to the server 1000. That is, the large-capacity storage device 1007 may include a computer readable medium (not shown), such as a hard disk or a CD-ROM driver.

Without loss of generality, the computer readable medium may include a computer storage medium and a communications medium. The computer storage medium includes volatile and non-volatile, movable and unmovable media implemented by using any method or technology and configured to store information such as a computer readable instruction, a data structure, a program module, or other data. The computer storage medium includes a static RAM (SRAM), an electrically erasable programmable ROM (EEPROM), an erasable programmable ROM (EPROM), a programmable ROM (PROM), an RAM, an ROM, a flash memory or another solid storage technology, and a CD-ROM, a digital versatile disc (DVD), or another optical storage, and a cassette, a tape, magnetic storage, or another magnetic storage device. Certainly, a person skilled in the art may know that the computer storage medium is not limited to the foregoing. The system memory 1004 and the large-capacity storage device 1007 may be uniformly referred to as a memory.

According to various embodiments of the present disclosure, the server 1000 may run by connecting to a remote computer on a network by using a network such as the Internet. That is, the server 1000 may be connected to a network 1012 by using a network interface unit 1011 connected to the system bus 1005, or the server 1000 may be connected to a network of another type or a remote computer system (not shown) by using a network interface unit 1011.

The memory further includes one or more programs. The one or more programs are configured to be executed by one or more processors, and include instructions used to perform the following operations:

receiving a rule obtaining request that is sent by using a user account identifier and that is used to request to obtain a deduction rule of a user-specified deduction item;

returning the deduction rule of the user-specified deduction item to the user account identifier, where the deduction rule is used to trigger the user account identifier to calculate a second resource value that is obtained after applying the deduction rule to a first resource value associated with the user-specified deduction item, and the first resource value is a resource value of a resource needing to be transferred when a target object associated with the user-specified deduction item is assigned to the user account identifier;

receiving a resource transfer request that is sent by the user account identifier and that carries the second resource value; and instructing a resource transfer server to transfer a resource of the second resource value out of a resource account of the user account identifier.

In some embodiments, the one or more programs further include instructions used to perform the following operations:

querying a prestored correspondence between a deduction item and a deduction rule for the deduction rule of the user-specified deduction item, where the correspondence is provided by a target object provider to a deduction server in advance; and returning the deduction rule of the user-specified deduction item to the user account identifier.

In some embodiments, the one or more programs further include instructions used to perform the following operations:

receiving a resource transfer result that is returned by the resource transfer server for the resource transfer request; and sending the resource transfer request to the user account identifier, where the resource transfer result is used to trigger an intelligent terminal at which the user account identifier is located to display the resource transfer result.

In some embodiments, the one or more programs further include instructions used to perform the following operations:

clearing, when the resource transfer result indicates a transfer success, the user-specified deduction item bound to the user account identifier; and sending a clearing notification to the user account identifier, where the clearing notification carries a deduction item identifier of the cleared deduction item, and the clearing notification is used to trigger the user account identifier to clear the user-specified deduction item identifier corresponding to the user-specified deduction item.

In some embodiments, the one or more programs further include instructions used to perform the following operations:

generating, when the resource transfer result indicates a transfer success, a new deduction item according to a deduction item generation rule provided by the target object provider; and sending the generated new deduction item to the user account identifier.

In an exemplary embodiment, a non-temporary computer readable storage medium including instructions is further provided, for example, a memory including instructions. The instructions may be executed by the processor of the deduction server, to perform the resource deduction method. For example, the non-temporary computer readable storage medium may be a ROM, a RAM, a CD-ROM, a magnetic disk, a floppy disk, or an optical data storage device.

The sequence numbers of the above embodiments of the present disclosure are merely for the convenience of description, and do not imply the preference among the embodiments.

A person of ordinary skill in the art may understand that all or some of the operations of the foregoing embodiments may be implemented by using hardware, or may be implemented by a program instructing relevant hardware. The program may be stored in a computer readable storage medium. The storage medium may be a ROM, a magnetic disk, an optical disc, or the like.

The foregoing descriptions are merely preferred embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A resource deduction method performed at a computer server having one or more processors and memory storing one or more programs to be executed by the one or more processors, the method comprising:

receiving, from a social networking application running at a mobile terminal, a deduction item obtaining request initiated by a user of the mobile terminal, the deduction item obtaining request including a user account identifier associated the user of the mobile terminal at the social networking application and a current location of the mobile terminal;

in response to the deduction item obtaining request, determining multiple deduction items in accordance with the user account identifier, the current location of the mobile terminal and the user's past consumption activities at service providers corresponding to the multiple deduction items and recorded under their respective service provider accounts at the social networking application;

returning the multiple deduction items to the mobile terminal, wherein the multiple deduction items are arranged at the mobile terminal using the social networking application in a predefined order according to at least their corresponding service providers' actual distances from the current location of the mobile terminal;

receiving, from the social networking application running at the mobile terminal, a rule obtaining request for a deduction rule associated with a user-specified deduction item; and in response to the rule obtaining request, returning the deduction rule associated with the user-specified deduction item, wherein the mobile terminal applies, via the social networking application, a transaction corresponding to the deduction rule to a first resource value associated with the user-specified deduction item, the first resource value being used to indicate the quantity of resources that need to be transferred from the user account identifier of the user of the mobile terminal to the corresponding service provider account when a target object associated with the user-specified deduction item is assigned to the user account identifier;

receiving, from the social networking application running at the mobile terminal, a resource transfer request corresponding to the transaction; and in response to the resource transfer request, returning a clearing notification to the mobile terminal, the clearing notification including an update to the user-specified deduction item at the corresponding service provider account according to the deduction rule to be displayed at the mobile terminal using the social networking application.

2. The method according to claim 1, wherein the mobile terminal applies, via the social networking application, a transaction corresponding to the deduction rule to a first resource value associated with the user-specified deduction item by:

calculating a second resource value after applying the transaction corresponding to the deduction rule;

subtracting, if the deduction rule comprises a third resource value and a deduction value that are restricted by a cash off deduction formula, when the first resource value is greater than the third resource value in the cash off deduction formula, the deduction value from the first resource value, to obtain a first candidate of the second resource value;

multiplying, if the deduction rule comprises a discount restriction condition and a first discount coefficient, when a user level of the user account identifier at a target object provider meets the discount restriction condition, the first resource value by the first discount coefficient, to obtain a second candidate of the second resource value, wherein the discount coefficient is less than 1;

multiplying, if the deduction rule comprises a point deduction condition and a second discount coefficient, when both the first resource value and a user point of the user account identifier at a target object provider meet the point deduction condition, the user point by the second discount coefficient, recording an obtained product as a deduction value, and subtracting the deduction value from the first resource value, to obtain a third candidate of the second resource value; and choosing one or more of the first candidate, the second candidate and the third candidate as the calculated second resource value.

3. The method according to claim 2, wherein the mobile terminal selects a minimum of the first candidate, the second candidate and the third candidate as the calculated second resource value.

4. The method according to claim 1, further comprising: sending the clearing notification to the mobile terminal after clearing from multiple deduction items that are capable of being used by the user account identifier.

5. The method according to claim 1, further comprising: in response to the resource transfer request, instructing a resource transfer server to transfer a resource of the first resource value out of a resource account of the user account identifier to a resource account of the corresponding service provider account and generating the update to the user-specified deduction item according to the first resource value and the deduction rule.

6. The method according to claim 5, wherein the update to the user-specified deduction item includes at least one new deduction rule that is newly available to the user account identifier.

7. The method according to claim 1, further comprising: in response to the rule obtaining request:
querying a prestored correspondence between a deduction item and a deduction rule for the deduction rule of the user-specified deduction item; and
returning the deduction rule associated with the user-specified deduction item to the mobile terminal.

8. A computer server, comprising one or more processors, memory and one or more programs stored in the memory that, when executed by the one or more processors, cause the computer server to perform a plurality of operations including:
receiving, from a social networking application running at a mobile terminal, a deduction item obtaining request initiated by a user of the mobile terminal, the deduction item obtaining request including a user account identifier associated the user of the mobile terminal at the social networking application and a current location of the mobile terminal;
in response to the deduction item obtaining request, determining multiple deduction items in accordance with the user account identifier, the current location of the mobile terminal and the user's past consumption activities at service providers corresponding to the multiple deduction items and recorded under their respective service provider accounts at the social networking application;
returning the multiple deduction items to the mobile terminal, wherein the multiple deduction items are arranged at the mobile terminal using the social networking application in a predefined order according to at least their corresponding service providers' actual distances from the current location of the mobile terminal;
receiving, from the social networking application running at the mobile terminal, a rule obtaining request for a deduction rule associated with a user-specified deduction item; and
in response to the rule obtaining request, returning the deduction rule associated with the user-specified deduction item, wherein the mobile terminal applies, via the social networking application, a transaction corresponding to the deduction rule to a first resource value associated with the user-specified deduction item, the first resource value being used to indicate the quantity of resources that need to be transferred from the user account identifier of the user of the mobile terminal to the corresponding service provider account when a target object associated with the user-specified deduction item is assigned to the user account identifier;
receiving, from the social networking application running at the mobile terminal, a resource transfer request corresponding to the transaction; and
in response to the resource transfer request, returning a clearing notification to the mobile terminal, the clearing notification including an update to the user-specified deduction item at the corresponding service provider account according to the deduction rule to be displayed at the mobile terminal using the social networking application.

9. The computer server according to claim 8, wherein the mobile terminal applies, via the social networking application, a transaction corresponding to the deduction rule to a first resource value associated with the user-specified deduction item by:
calculating a second resource value after applying the transaction corresponding to the deduction rule;
subtracting, if the deduction rule comprises a third resource value and a deduction value that are restricted by a cash off deduction formula, when the first resource value is greater than the third resource value in the cash off deduction formula, the deduction value from the first resource value, to obtain a first candidate of the second resource value;
multiplying, if the deduction rule comprises a discount restriction condition and a first discount coefficient, when a user level of the user account identifier at a target object provider meets the discount restriction condition, the first resource value by the first discount coefficient, to obtain a second candidate of the second resource value, wherein the discount coefficient is less than 1;
multiplying, if the deduction rule comprises a point deduction condition and a second discount coefficient, when both the first resource value and a user point of the user account identifier at a target object provider meet the point deduction condition, the user point by the second discount coefficient, recording an obtained product as a deduction value, and subtracting the deduction value from the first resource value, to obtain a third candidate of the second resource value; and
choosing one or more of the first candidate, the second candidate and the third candidate as the calculated second resource value.

10. The computer server according to claim 9, wherein the mobile terminal selects a minimum of the first candidate, the second candidate and the third candidate as the calculated second resource value.

11. The computer server according to claim 8, wherein the plurality of operations further comprise:
sending the clearing notification to the mobile terminal after clearing from multiple deduction items that are capable of being used by the user account identifier.

12. The computer server according to claim 8, wherein the plurality of operations further comprise:
in response to the resource transfer request, instructing a resource transfer server to transfer a resource of the first resource value out of a resource account of the user account identifier to a resource account of the corresponding service provider account and generating the update to the user-specified deduction item according to the first resource value and the deduction rule.

13. The computer server according to claim 12, wherein the update to the user-specified deduction item includes at least one new deduction rule that is newly available to the user account identifier.

14. The computer server according to claim 8, wherein the plurality of operations further comprise:
in response to the rule obtaining request:
querying a prestored correspondence between a deduction item and a deduction rule for the deduction rule of the user-specified deduction item; and
returning the deduction rule associated with the user-specified deduction item to the mobile terminal.

15. A non-transitory computer readable storage medium storing one or more computer readable instructions that, when being executed by one or more processors of a computer server, cause the computer to perform a plurality of operations including:
receiving, from a social networking application running at a mobile terminal, a deduction item obtaining request initiated by a user of the mobile terminal, the deduction item obtaining request including a user account identifier associated the user of the mobile terminal at the social networking application and a current location of the mobile terminal;
in response to the deduction item obtaining request, determining multiple deduction items in accordance with the user account identifier, the current location of the mobile terminal and the user's past consumption activities at service providers corresponding to the multiple deduction items and recorded under their respective service provider accounts at the social networking application;
returning the multiple deduction items to the mobile terminal, wherein the multiple deduction items are arranged at the mobile terminal using the social networking application in a predefined order according to at least their corresponding service providers' actual distances from the current location of the mobile terminal;
receiving, from the social networking application running at the mobile terminal, a rule obtaining request for a deduction rule associated with a user-specified deduction item; and
in response to the rule obtaining request, returning the deduction rule associated with the user-specified deduction item, wherein the mobile terminal applies, via the social networking application, a transaction corresponding to the deduction rule to a first resource value associated with the user-specified deduction item, the first resource value being used to indicate the quantity of resources that need to be transferred from the user account identifier of the user of the mobile terminal to the corresponding service provider account when a target object associated with the user-specified deduction item is assigned to the user account identifier;
receiving, from the social networking application running at the mobile terminal, a resource transfer request corresponding to the transaction; and
in response to the resource transfer request, returning a clearing notification to the mobile terminal, the clearing notification including an update to the user-specified deduction item at the corresponding service provider account according to the deduction rule to be displayed at the mobile terminal using the social networking application.

16. The non-transitory computer readable storage medium according to claim 15, wherein the mobile terminal applies, via the social networking application, a transaction corresponding to the deduction rule to a first resource value associated with the user-specified deduction item by:
calculating a second resource value after applying the transaction corresponding to the deduction rule;
subtracting, if the deduction rule comprises a third resource value and a deduction value that are restricted by a cash off deduction formula, when the first resource value is greater than the third resource value in the cash off deduction formula, the deduction value from the first resource value, to obtain a first candidate of the second resource value;
multiplying, if the deduction rule comprises a discount restriction condition and a first discount coefficient, when a user level of the user account identifier at a target object provider meets the discount restriction condition, the first resource value by the first discount coefficient, to obtain a second candidate of the second resource value, wherein the discount coefficient is less than 1;
multiplying, if the deduction rule comprises a point deduction condition and a second discount coefficient, when both the first resource value and a user point of the user account identifier at a target object provider meet the point deduction condition, the user point by the second discount coefficient, recording an obtained product as a deduction value, and subtracting the deduction value from the first resource value, to obtain a third candidate of the second resource value; and
choosing one or more of the first candidate, the second candidate and the third candidate as the calculated second resource value.

17. The non-transitory computer readable storage medium according to claim 16, wherein the mobile terminal selects a minimum of the first candidate, the second candidate and the third candidate as the calculated second resource value.

18. The non-transitory computer readable storage medium according to claim 15, wherein the plurality of operations further comprise:
sending the clearing notification to the mobile terminal after clearing from multiple deduction items that are capable of being used by the user account identifier.

19. The non-transitory computer readable storage medium according to claim 15, wherein the plurality of operations further comprise:
in response to the resource transfer request, instructing a resource transfer server to transfer a resource of the first resource value out of a resource account of the user account identifier to a resource account of the corresponding service provider account and generating the update to the user-specified deduction item according to the first resource value and the deduction rule.

20. The non-transitory computer readable storage medium according to claim 15, wherein the plurality of operations further comprise:
in response to the rule obtaining request:
querying a prestored correspondence between a deduction item and a deduction rule for the deduction rule of the user-specified deduction item; and
returning the deduction rule associated with the user-specified deduction item to the mobile terminal.

* * * * *